(12) United States Patent
Hullinger

(10) Patent No.: US 6,430,485 B1
(45) Date of Patent: Aug. 6, 2002

(54) WIRELESS INTERFACE ADAPTOR FOR REMOTE DIAGNOSIS AND PROGRAMMING OF VEHICLE CONTROL SYSTEMS

(75) Inventor: Daniel W. Hullinger, Fort Wayne, IN (US)

(73) Assignee: International Truck Intellectual Property Company, L.L.C., Warrenville, IL (US)

( * ) Notice: Subject to any disclaimer, the term of this patent is extended or adjusted under 35 U.S.C. 154(b) by 0 days.

(21) Appl. No.: 09/611,039

(22) Filed: Jul. 6, 2000

(51) Int. Cl.[7] .............................................. G01M 17/00
(52) U.S. Cl. ........................ 701/33; 701/29; 340/870.16
(58) Field of Search .............................. 701/29, 30, 33, 701/34; 340/870.16, 438, 439, 825.69, 825.72, 901; 370/913, 915, 241, 242

(56) References Cited

U.S. PATENT DOCUMENTS 5,479,157 A * 12/1995 Suman et al. .......... 340/825.31
5,938,716 A * 8/1999 Shutty et al. ................ 701/115
6,055,468 A * 4/2000 Kaman et al. ................ 701/29
6,141,610 A * 10/2000 Rothert et al. ................ 701/35

* cited by examiner

Primary Examiner—Yonel Beaulieu
(74) Attorney, Agent, or Firm—Jeffrey P. Calfa; Neil T. Powell; Dennis Kelly Sullivan

(57) ABSTRACT

An apparatus and a method of evaluating vehicle electrical control systems implements a base evaluation and programming station by an appropriately programmed portable computer. A wireless network communication interface is connected to the base evaluation and programming station. Vehicles may then be brought into the general vicinity of the base station. The electrical control system for each vehicle brought into range for testing may be temporarily attached to a transferable wireless node including a wireless communication interface and two way data staging element. Thereupon an ad hoc network is established with individual communication links between the wireless communication interface connected to the base evaluation and programming station and each transferable wireless communication interface.

12 Claims, 3 Drawing Sheets

WIRELESS INTERFACE ADAPTOR FOR REMOTE DIAGNOSIS AND PROGRAMMING OF VEHICLE CONTROL SYSTEMS

BACKGROUND OF THE INVENTION

1. Field of the Invention

The present invention relates to external systems for vehicle diagnostics and more particularly to a wireless communication system for vehicle diagnostics equipment.

2. Description of the Prior Art

Contemporary designs for the control and management of vehicle components increasingly rely on methods derived from computer networking. Digital data is exchanged between component controllers over a common physical layer, such as a twisted shielded pair of wires. Intelligible communication between two or more device controllers among a greater plurality of devices, all occurring over the common physical layer, depends upon the communicating devices being able to discriminate among messages they receive and respond to those messages directed to them. Such methods are well known in the art and are part of the standards which the Society of Automotive Engineers (SAE) has published and continues to publish as part of the SAE J1939, and SAE J1708/1587 protocols. Another pertinent protocol is the Assembly Line Data Link (ALDL) protocol published by General Motors Corp.

These protocols define the performance requirements of the medium of the physical layer, but also allow for development of proprietary protocols. The SAE J1939 protocol is a specialized application of a controlled area network (CAN) and may be readily implemented utilizing commercial integrated circuits such as the C167 Integrated Circuit from Siemens of Germany. The J1708/1587 was R5485. ALDL uses a standard Universal Asynchronous Receiver/Transmit (UART) port.

The CAN protocol is an ISO standard (ISO 11898) for serial data communication, particularly aimed at automotive applications. The CAN standard includes a physical layer (including the data bus) and a data-link layer, which define a few different message types, arbitration rules for bus access and methods for fault detection and fault confinement. The physical layer uses differential transmission on a twisted pair wire bus. A non-destructive bitwise arbitration is used to control access to the bus. Messages are small, at most eight bytes, and are protected by checksum error detection. Each message carries a numeric value which controls its priority on the bus and typically also serves as an identification of the contents of the message. CAN offers an error handling scheme that results in retransmission of messages when they are not properly received. CAN also provides means for removing faulty nodes from the bus. CAN further adds the capability of supporting what are termed "higher layer protocols" for standardizing startup procedures including bit rate setting, distributing addresses among participating nodes or kinds of messages, determining the layout of the messages and routines for error handling on the system level.

Digital data communications over serial data paths are an effective technique for reducing the number of dedicated communication paths between the numerous switches, sensors, devices and gauges installed on the vehicles. Multiplexing the signals to and from local controllers on a bus gives greater physical simplicity through displacing much of the vehicle wiring harness thereby reducing manufacturing costs and enhancing system reliability.

Considering, by way of example, the J1939 standard, diagnostic and programming stations used for performing vehicle, particularly truck, diagnostic routines have routinely communicated with a vehicle's internal network by an external J1939 linkage. The external linkage comprises a J1939 compatible cable connected between an external, temporarily connected computer and a diagnostic port which is, in turn, on a node of the internal vehicle network. The diagnostic program then runs on the external computer and communicates with the vehicle network over the external linkage.

External J1939 cable linkages and supporting equipment are limited to about 4 meters (13') in length without the need to introduce line amplifiers. Specifically, the cables from the vehicle diagnostic plug to an interface adaptor are limited to about 1 meter (3') and the standard recommends a maximum length of only about 46 cm (18'). The serial port cable from the computer to the interface adaptor is allowed to be a maximum of about 2.75 meters (9'). Given an interface adaptor length of about a foot, thirteen feet is the maximum spacing that can be obtained with a physical connection. Since the interface adaptor is required to be connected to the computer serial port, the maximum allowed data rate is 115 kb/s into the computer notwithstanding the fact that the J1939 network can run at 250 kb/s. These interface limitations limit the system to testing one truck at a time and require either that the diagnostic computer be brought into close proximity to the truck being tested or that a number of expensive line amplifiers be used, which slow the process of testing vehicles and add expense.

Wireless communications systems have recently become widespread, but have not been applied to vehicle diagnostics stations. Among the standards for wireless communication are those for wireless local area networks (WLAN), including specifically the 802.15 Standard of the Institute of Electrical and Electronics Engineers (IEEE Stnd. 802.15). The topology of such networks may be ad hoc, that is established temporarily for a particular purpose among nodes or stations which recognized each other and which have established communications.

Three types of network physical layers have been widely used for WLAN: (1) Direct Sequence Spread Spectrum (DSSS) radio; (2) Frequency Hopped Spread Spectrum (FHSS); and (3) Infrared (IR). The IEEE Stnd. 802.15 provides a FHSS physical layer. FHSS exploits the 2.4 GHz Instrumentation, Scientific and Medical microwave band, in which the FCC and numerous international and foreign authorities have allowed unlicensed low power density transmission. At the time that this patent is being written, FHSS physical layers support data transmission speeds up to 1 Mb/s and it is anticipated that data transmission speeds of up to 2 Mb/s will become available without changes to the physical layers. In terms of components, a WLAN may be established by introducing the appropriate cards to computers and attaching the cards to antenna. For example, Ericsson, Inc. Components of Richardson, Texas supplies a radio which may be installed on a PC card which, in turn, plugs into a PCMCIA bus commonly used in portable computers and to which an external antenna may be connected to implement a potential node in a WLAN.

SUMMARY OF THE INVENTION

The invention provides an apparatus and a method of evaluating vehicle electrical control systems. In implementing the method of the invention a base evaluation and programming station is provided by an appropriately programmed portable computer. A wireless network communication interface is connected to the base evaluation and programming station. Vehicles may then be brought into the general vicinity of the base station. The electrical control system for each vehicle brought into range for testing may be temporarily attached to a transferable wireless node including a wireless communication interface and two way data staging element. Thereupon an ad hoc network is established with individual communication links between the wireless communication interface connected to the base evaluation and programming station and each transferable wireless communication interface.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
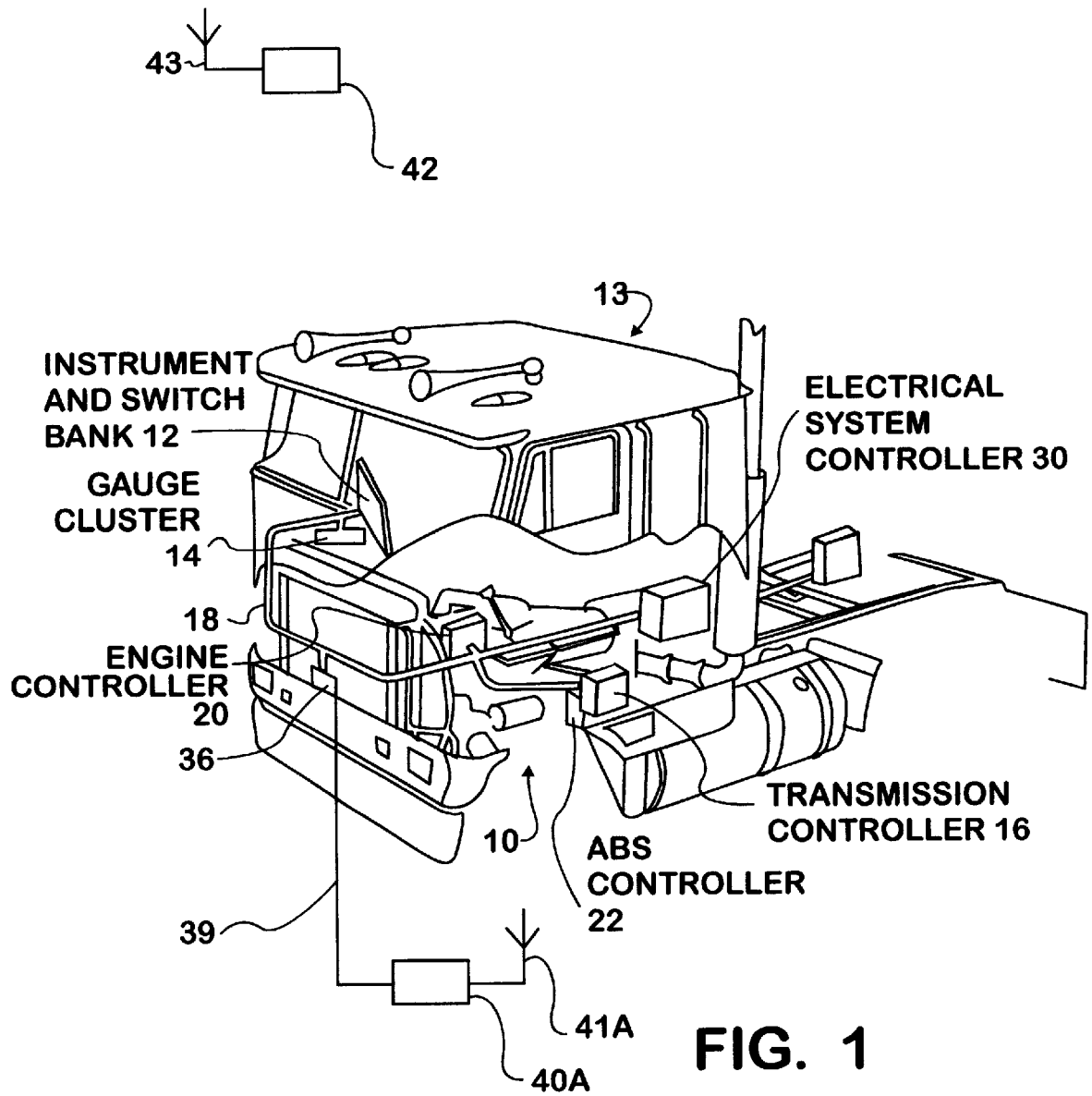
FIG. 1 is a perspective view in partial cutaway of a truck and electrical control system installed on the truck.

FIG. 1 is a perspective view of a vehicle 13 and of an electrical control system 10 installed on the vehicle. Vehicle electrical system 10 comprises a twisted pair (either shielded or unshielded) cable operating as a serial data bus 18. Collectively, bus 18 and the various nodes attached thereto form a controller area network (CAN). The following discussion refers primarily to the J1939 protocol as exemplary of the three protocols to which the invention is readily applied. Reference to the other protocols may be made where a specific feature differs.

Active vehicle components are typically controlled by one of a group of autonomous, vocational controllers, which include a gauge cluster 14, an engine controller 20, a transmission controller 16, an auxiliary instrument and switch bank 12, and an antilock brake system (ABS) controller 22, all of which are nodes on bus 18. The autonomous controllers include local data processing and programming and are typically supplied by the manufacturer of the controlled component. Bus 18 is a twisted pair cable constructed in accordance with SAE standard J1939 and is externally accessible via a diagnostic port 36. Diagnostic port 36 is typically located under the steering column inside the cab of vehicle 13, but may be located elsewhere on the vehicle.

In many applications, the autonomous controllers handle many functions locally, utilizing data received over bus 18 from other controllers. Some CAN networks may include an Electrical System Controller (ESC) 30, in which case they report data to ESC 30 and receive operational requests from ESC 30. Where present, ESC 30 manages a number of vocational controllers connected to bus 18 as nodes and disposed on vehicle 13. ESC 30 also executes a load management program which oversees the total load imposed on the vehicle electrical system and power train by various accessories installed on the vehicle.

The loads imposed on vehicle 13 systems controlled by electrical control system 30 are usually electrical loads, however, they may include electronically controlled engagement of mechanical devices to the power train of vehicle 13. Gear selection in an automatic transmission would be an example of such a system. Other electrically controlled nonelectrical loads can include control of a clutch for an air conditioning compressor, or actuation of pumps driven by the vehicle drive train. The load management program can, depending on power demands by components, request increased power output from the engine through engine controller 20.

Gauge cluster 14, transmission controller 16 and engine controller 20 can all communicate with ESC 30, which then monitors inputs received from the auxiliary instrument and switch bank 12 over the serial communication link in harness 18. ESC 30 may be programmed to override the normal response characteristics of the gauge cluster 14, transmission controller 16 and engine controller 20, should electrical and mechanical loads exceed the capacity of the vehicle, should requests conflict with one another, and under other circumstances.

A wireless network node 40A is connected to diagnostic port 36 by a J1939 compatible cable 39. Wireless network node 40A may be implemented in a package including a FHSS transceiver and sufficient controlling intelligence to stage data and identify the station in an ad hoc network comprising at least one other node 42. Nodes 40A and 42 communicate via antennas 41A and 43. One or more additional nodes equivalent to node 40A may simultaneously be networked for communication with node 42.

Figure 2:
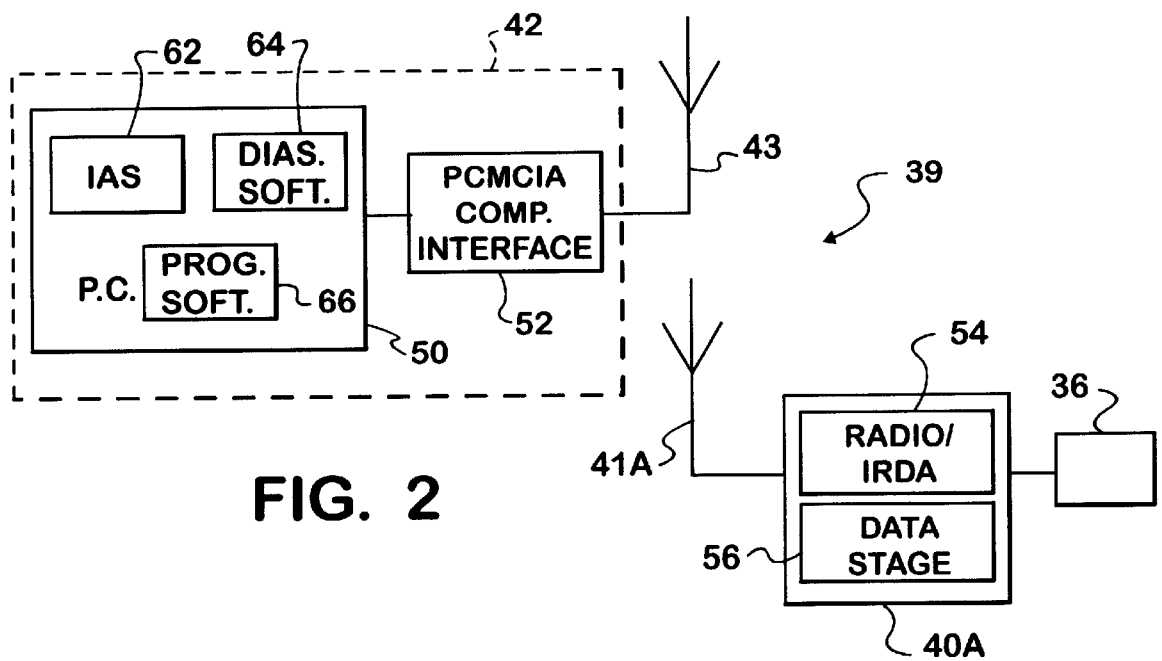
FIG. 2 is a schematic high level view of the major components of the wireless communication system for programming and evaluation of a vehicle electrical system.

FIG. 2 illustrates a two node network 39 comprising nodes 40A and 42. Wireless network nodes 40A and 42 usually communicate through a wireless radio link established over antennas 41A and 43. Alternatively, an Infrared LED Array (IrDA) can be used, however, IrDA systems work over shorter distances than radio based links. The J1939 compatible vehicle electronic network 10 conventionally runs at 250 kb/s. Current wireless LAN systems utilizing FHSS operate at 1 Mb/s, and it is expected that they will be extended to operate at speeds up to 2 Mb/s. Under current standards up to four vehicles can theoretically communicate with a base node and it is expected that up to eight vehicles will soon be possible. Multiple vehicles communicate with the base node 42 using time division multiplexing (TDM) with conventional collision detection and avoidance routines.

Wireless network node 42 operates as a base node in the network, handling programming and evaluation of truck control networks by execution of programming software modules 66 and diagnostic software modules 64 on a portable personal computer 50. An interface access software module 62 handles formatting and transmission of the data to a PCMCIA bus compatible interface board 52 which in turn is connected to an antenna 43.

Trucks are temporarily connected to a transferable node 40A via a J1939 diagnostic port 36. Transferable node 40A includes a data staging element 56 for two way transmission of data back to diagnostic port 36 and out over antenna 41A from a radio or IrDA stage 54. Sufficient processing power is included in transferable node 40A to handle data staging, format conversion and WLAN establishment.

Figure 3:
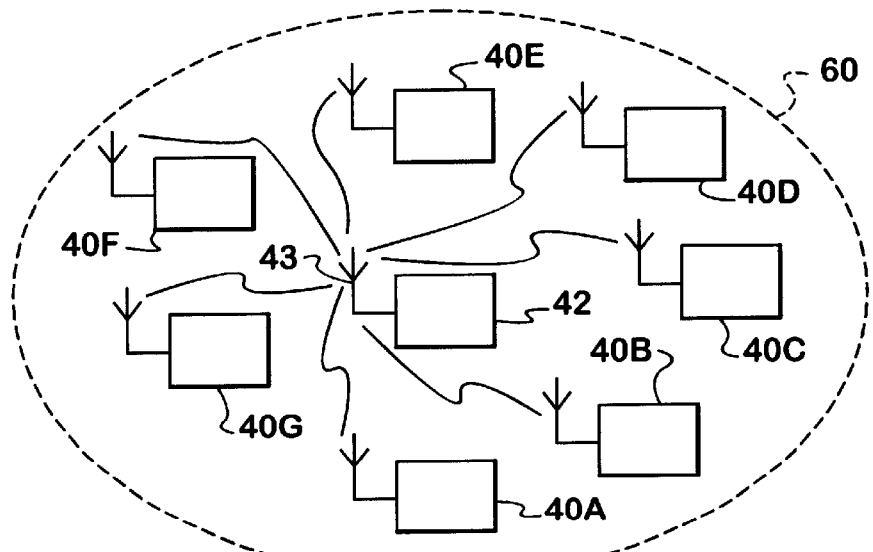
FIG. 3 is a topological map of an ad hoc network formed by a base unit and a plurality of transferable units used with the invention.

FIG. 3 illustrates a topology of a network 60 established between base node 42 and a plurality of transferable nodes 40A–40F which may be linked among an ever changing group of vehicles. The topology is essentially a hub and spoke system, the transferable nodes 40A–40G having no cause for direct communication therebetween.

Figure 4:
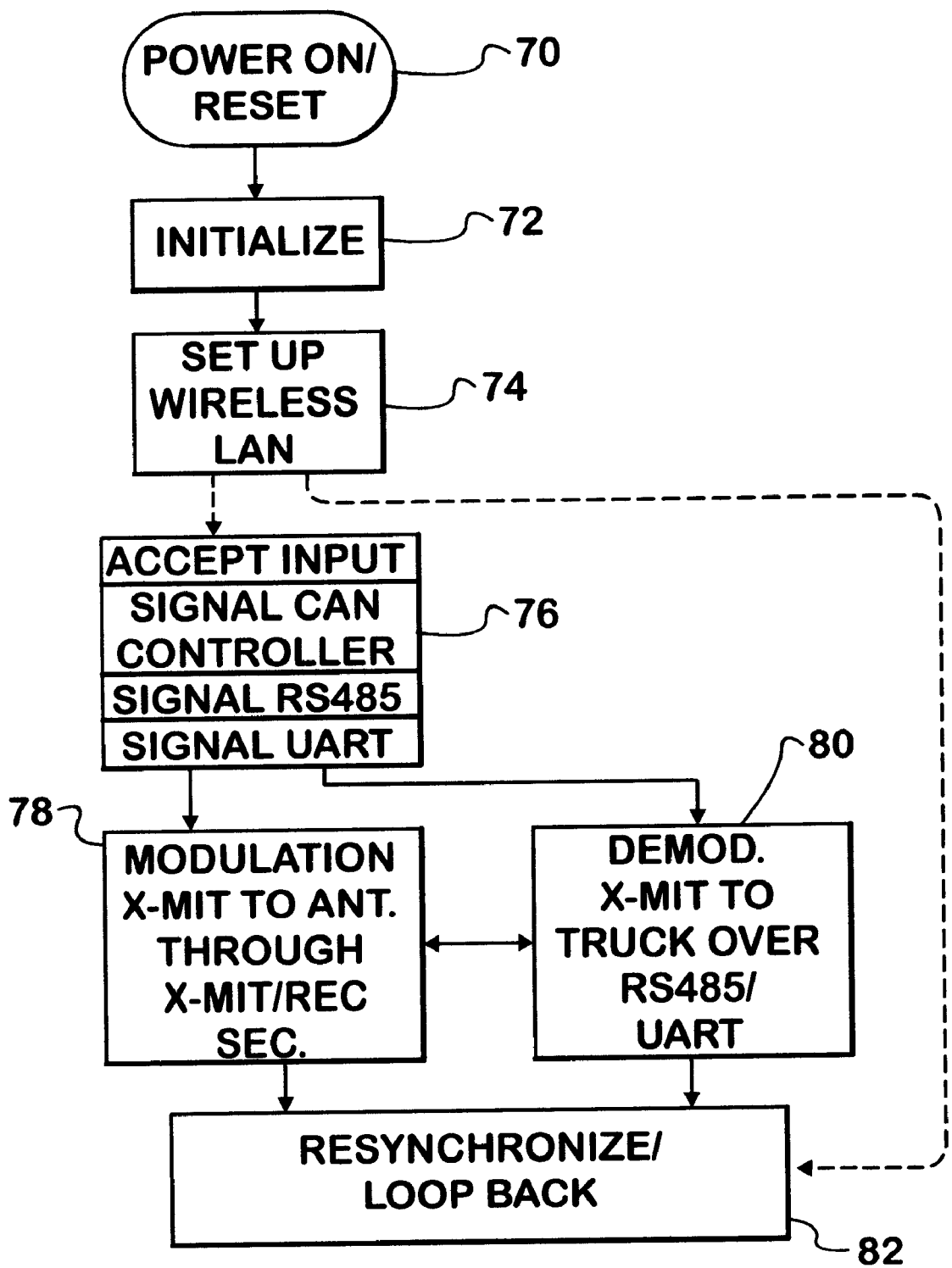
FIG. 4 is a flow chart for operation of wireless communication units.

FIG. 4 is a flow chart illustrating operation of a communication module for establishing a node on a wireless network employed for the programming and diagnostic evaluation of motor vehicle electronic control systems conforming to the SAE J1939 standard. The program represented by the flow chart must handle bi-directional transfer of data between a wireless LAN and the vehicle oriented SAE J1939 compatible network installed on each vehicle undergoing testing.

From a power on/reset condition 70 operation moves to an initialization subroutine 72, which includes conventional testing and transfer to memory of values for various system variables. Then a wireless LAN (WLAN) is established at step 74. Here addresses are assigned to transferable nodes, and potentially reassigned upon nodes being moved between vehicles. One each of the two paths from step 74 apply to one or the other type of node in WLAN 60. For a base node 42 processing is illustrated as continuing at step 82. Commercially available WLAN software handles all of the hand off of data from a personal computer to WLAN hardware for the base node 42 of the system.

Conversion of data formatted for the J1939 network to the WLAN requires different handling, which is handled in the transferable nodes 40A–40G by execution of steps 76–80. Within step 76, upon acceptance of an input over WLAN 60, the J1939 CAN (controller area network) for vehicle control system 10 is signaled. Similarly, the IEEE RS485 port (i.e. diagnostic port 36) and Universal Asynchronous Receive/Transmit port may be used, which support communication data transfer with the J1708/1587 and ALDL protocols. Thereafter, as required, data is passed from WLAN 60 to vehicle, using demodulation step 80. From vehicle to WLAN is done with modulation step 78 which provides data transfer to transmivreceive section 54 (i.e. radio, IrDA, etc.).

The invention allows the testing of a plurality of vehicles in parallel by applying WLAN technology to the test area. The base evaluation and programming station also provides a base node for the WLAN, and a communication hub to a plurality of transferable nodes which are transferable among an ever changing group of trucks, The ad hoc network is established with individual communication links between the wireless communication interface connected to the base evaluation and programming station and each transferable wireless communication interface. The distances over which evaluation can be done are increased over the prior art and data transfer speeds are simultaneously increased up to the limit the J1939 vehicle control networks.

While the invention is shown in only one of its forms, it is not thus limited but is susceptible to various changes and modifications without departing from the spirit and scope of the invention.

What is claimed is:

1. A diagnostic system for a changeable selection of motor vehicle electrical control systems, where each motor vehicle electrical control system includes a data bus, an electrical system controller connected to the data bus and a standard diagnostic port connected to the bus, the diagnostic system comprising:

a base programming and evaluation station;

a first wireless communication interface connected to the base programming and evaluation station; and a transferable node including a bi-directional data staging interface connectable to a diagnostic port for a vehicle electrical control system; and a second wireless communication interface connected to the data staging interface.

2. A diagnostic system as set forth in claim 1, further comprising a communications link between the first and second wireless communication interfaces.

3. A diagnostic system as set forth in claim 2, further comprising a plurality of transferable nodes, each transferable node being connected to a wireless communication interface.

4. A diagnostic system as set forth in claim 3, further comprising a plurality of wireless communications links, including one link between the wireless communication interface connected to the base programming and evaluation station and the wireless communication interface for each transferable node.

5. A diagnostic system as set forth in claim 4, further comprising means for time division multiplexing the links.

6. A diagnostic system as set forth in claim 5, wherein the communications links are microwave range radio signals.

7. A method of evaluating vehicle electrical control systems, the method comprising the steps of:

providing a base evaluation and programming station;

connecting a wireless network communication interface to the base evaluation and programming station;

bringing one or more vehicles having electrical control systems into range of the wireless communication interface;

connecting individual transferable wireless communication interfaces to diagnostic ports of the electrical control systems for the vehicles;

establishing an individual communication link between the wireless communication interface connected to the base evaluation and programming station and each individual transferable wireless communication interface;

staging data for bi-directional transfer in the individual transferable wireless communication interfaces; and allowing removal and reconnection of the individual transferable wireless communication interfaces to diagnostic ports between changing groups of vehicles.

8. A method as set forth in claim 7, wherein the individual communications links are microwave radio signals.

9. A method as set forth in claim 8, further comprising the step of time division multiplexing the individual communications links.

10. Apparatus comprising:

a changing group of motor vehicle electrical control systems, each having a diagnostic port;

a base programming and evaluation station;

a base wireless communication interface connected to the base programming and evaluation station; and a plurality of transferable nodes, each transferable node including a data staging interface connectable to a diagnostic port for a vehicle electrical control system and a mobile wireless communication interface connected to the data staging interface the transferable nodes being moveable from one diagnostic port to another.

11. Apparatus as claimed in claim 10, further comprising:

the base wireless communication interface and the mobile wireless communication interfaces allowing establishment of a plurality of radio links among themselves, with the base wireless communication interface connected to the base programming and evaluation station serving as a hub.

12. Apparatus as claimed 11, further comprising:

means for time division multiplexing the radio links.

* * * * *